United States Patent [19]

Meyer

[11] 4,264,760

[45] Apr. 28, 1981

[54] METHOD OF ABATING ALDEHYDE ODOR IN RESINS AND PRODUCTS PRODUCED THEREFROM

[76] Inventor: Carl B. Meyer, Chemistry Department, BG-10, University of Washington, Seattle, Wash. 98195

[21] Appl. No.: 75,536

[22] Filed: Sep. 13, 1979

[51] Int. Cl.³ .......................... C08G 2/00; C08G 8/00; C08G 12/00; C08G 14/00
[52] U.S. Cl. .................................. 528/230; 525/505; 528/487; 528/265
[58] Field of Search ...................... 528/230, 487, 266; 525/505

[56] References Cited

U.S. PATENT DOCUMENTS

| | | | |
|---|---|---|---|
| 2,113,485 | 4/1938 | Kreidl | 528/232 |
| 2,505,782 | 5/1950 | Meiler et al. | 260/17.2 |
| 3,336,256 | 8/1967 | Rosen | 528/230 |
| 4,152,320 | 5/1979 | Shapiro et al. | 528/219 |

*Primary Examiner*—Lucille M. Phynes
*Attorney, Agent, or Firm*—Cushman, Darby & Cushman

[57] ABSTRACT

Conventional aldehyde containing resins for making bonded products or insulation foam are deodorized by the addition thereto of a sulfur compound such as oxyacid salts of sulfur in a valence state ranging from +5 to −2 inclusive.

22 Claims, No Drawings

METHOD OF ABATING ALDEHYDE ODOR IN RESINS AND PRODUCTS PRODUCED THEREFROM

BACKGROUND OF THE INVENTION

The present invention is concerned with the formulation and application of additives to cold or thermosetting resin compositions containing a curable resin such as urea-formaldehyde, melamine formaldehyde, phenol formaldehyde or any condensation product containing any mixture or combination, copolymer or blend thereof. The purpose is to retain and exploit all mechanical, chemical and economic advantages of these resins, especially those formulations containing a significant molar excess of formaldehyde, while reducing the release and odor of formaldehyde of such products during the manufacture thereof and in the finished state.

There is an increasing demand for strong and economical adhesives and other resin for use in making bonded wood and other products such as insulating foams. In such products, cured resins substantially determine the nature and quality of the resulting product. New building technology and environmental concern increase demands that such materials reliably fulfill a variety of exacting standards.

Ideally, ingredients for such resins should be readily available, and should be mixed and formulated easily, preferably using customary procedure or simple modifications thereof. For this purpose the resin should have a long storage life, should be quick setting on application and should be non-odorous and non-toxic and useable with standard equipment. Additionally, the bonded product obtained with the adhesive should have good strength, elasticity, durability and acceptable color. Furthermore, the resin should be useful over a wide range of working conditions, because, even though good bond strength may be possible under certain conditions, the resin may not be acceptable if such results cannot be readily achieved over a wide variation of operations so as to accommodate accepted methods used for specific products, or as necessary to meet local production standards and methods, or the use of different types of materials. Finally, the adhesive should fulfill environmental quality considerations, the highest standards of industrial hygiene, and its application should not be costly.

The art of formulating and applying urea-formaldehyde, melamine-formaldehyde, phenolformaldehyde and similar resins is well established, [see B. Meyer, UF-Resins, Addison-Wesley, Waltham, Mass., 1979, in press] and a wealth of modifications and combinations have been and are being formulated to fulfill specific needs arising from the materials to be bonded, or requirements of product performance. For example, a resin containing approximately 40% melamine, 50% urea and 10% phenol has well known properties which can be correlated to well known application and production standards of earlier or individual components resins [see, J. Mayer and C. Schmidt-Hellerau, German Off. No. 2,020,481, now: U.S. Pat. No. 3,734,918, "Phenol-urea-melamine resin adhesive for wood."].

However, for intrinsic chemical reasons, almost all good and economic resins contain a substantial molar excess of formaldehyde. Some of this is released during the curing of the resin, for example in the hot press during the manufacture of particle board, causing obnoxious fumes. Some is slowly released from the finished product, and imparts upon the product an odor which in many modern applications, e.g. the construction or furniture industry, is considered objectionable. In addition, the resins contain some methylol and other intermediates and reaction products which can readily and reversibly hydrolyse, yielding methylene glycol and, finally formaldehyde. Furthermore, some resins, especially those containing urea-formaldehyde, tend to slowly decompose during aging, hydrolysis, weathering and thereby likewise release objectionable formaldehyde. This formaldehyde release rate is in direct conflict with conditions for optimizing almost all other factors and properties. The release is especially noticeable in particle board and in insulation foams, both of which contain cured resin films with a very large surface and which enhance this release. These films are of uneven thickness, which makes uniform curing very difficult. In particle board, the wood can act like a sponge, holding water in contact with the resin, and the swelling and shrinking during changes in humidity exacerbates the problem.

Several paths have been explored for many years for reducing formaldehyde release, but all entail significant mechanical, chemical or economic disadvantages. For example, a large number of urea-formaldehyde resins have been formulated incorporating sulfite wastes or lignosulfonates [see, for example, E. Roffael & W. Rand, Holzforschung, volume 27, page 178, 1973; and U.S. Pat. No. 3,994,850]. However, in order to obtain products equivalent to traditional urea-formaldehyde resins, an excess of about 1-5% of resin must be applied, a higher curing temperature is necessary and longer curing or press times are required, followed sometimes by autoclaving. Unfortunately, the products tend to be more brittle. Similar problems are encountered if traditional resins are post-cured with urea or phenol in order to reduce the free formaldehyde in the resin [see for example: C. T. O'Neill, U.S. Pat. No. 3,996,190], as all these methods modify the chemistry of the resin structure or skeleton, modify the properties during application, and modify the products. A summary of the problems are contained in H. J. Deppe and K. Ernst, "Taschenbuch der Spanplattentechnik", DRW-Verlag, Stuttgart, 1977. S. Imura and N. Minemura, Hokkaido Fosert Prod. Res. Institute, Rinsan Shikenjo Geppo Vol. 305, pages 1-5, 1977, have reported reduction of formaldehyde odor from finished plywood by washing it with aqueous solutions of several oxyacids of sulfur. Their procedure differs from this invention in that the finished product is treated. This includes wood as well as cured UF-resin. Their procedure is less effective, requires far more effort and might cause corrosion and other problems which are not found in our invention.

Thus, there is a need in the art to provide an additive suitable for simple blending with a wide range of formaldehyde containing resin formulations, such as those currently used or tested for use in making insulating foams or thermo-pressed bonded products. Such an additive should not significantly or adversely affect the properties and behavior of the stored or ready-to-use resin, so that it can be used in every way in an equal manner to that of the resin without addition of the additive. Furthermore, the curing of the bulk, or at least a large fraction of the resin should not be significantly altered, and the chemical structure and skeleton of the ready-to-use resin should not be basically changed, so that a bonded product of equal or better qualities to those of the unmodified resin is obtained, but excess formaldehyde and release of free formaldehyde is greatly reduced, and thus the objectionable odor significantly abated.

Accordingly, an object of the invention is to modify a variety of prior art formaldehyde resins with a sulfur containing additive so as to retain and provide optimum properties as characteristic for the resins, while exhibiting reduced odor during curing in a hot press and/or in the cured resin.

Other objects will also be hereinafter apparent from the description of the invention which follows.

Broadly stated, the above and other objects are realized by adding a sulfur containing compound to ready-to-use, conventional, formaldehyde containing resins, such as for example, urea-formaldehyde, phenol-formaldehyde, melamine formaldehyde, or any cocondensation products such as melamine-urea-formaldehyde, or melamine-urea-phenol-formaldehyde. The sulfur is preferably present in any valance state other than +6, or any intermediate state or combination of such states, e.g., +5 to −2. Sulfur in the oxidation state of six, e.g. sulfate, is not found effective. The sulfur compounds can be introduced alone, in combination, or in combination with other resin components or odor reducing agents such as ammonia, ammonium chloride, quanidine, etc.

DESCRIPTION OF THE PREFERRED EMBODIMENT

Among the suitable compounds are all oxyacids of sulfur containing the proper oxidation states, for example: thiosulfates, polythionates, sulfites, pyrosulfites (disulfites), dithionites, elemental sulfur and sulfides. An overview of these compounds is found, for example, in B. Meyer, "Sulfur, Energy & Environment," Elsevier, Amsterdam, 1977, or in earlier reviews quoted therein. Of the above compounds, dithionites, elemental sulfur and mixtures thereof are particularly suitable deodorizers. Indeed, dithionites, sulfur and mixtures thereof not only produce a significant deodorizing effect, in and of themselves, but seem to interact synergistically with the other sulfur compounds of the present invention to produce an enhanced deodorizing effect.

Any and each of the mentioned anions may be used in form of inorganic salts, such as the sodium, potassium, ammonium or other salts, their aqueous or alcoholic solutions or from organic compounds or inorganic compounds capable of releasing sulfur or its oxyacids in the proper oxidation state. Likewise, sulfides may be organics, such as mercaptans, metastable disulfides, etc, or may derive from inorganic sulfide or hydrosulfide salts or compounds, such as those of alkali metals, alkaline earths, transition metals or ammonium. The additive may contain any one or a mixture of the above in aqueous or alcoholic solution, suspension, slurry, as a solid or suspended in phenolic, amineous or heterocyclic solvents. The additive may be used to supplement normal resin quantities, or in some cases where the additive contributes directly or indirectly to bonding, some resin might be substituted. It is also desirable to use resins with high formaldehyde content, such as commonly used in the years prior to environmental concern, or reinforce the normal resin with excess formaldehyde to take advantage of strength of other properties added by this excess formaldehyde.

To produce a deodorizing effect, the sulfur containing composition should be added to the resin in an amount sufficient to bind excess formaldehyde. In numerical terms, the additive composition of the invention will normally contain from about 0.3 to 30% by weight, preferably 1 to 10% of sulfur value based on weight of total resin solids. The sulfur containing additive best matches formaldehyde excess in the hardened resin in a molar ratio of 0.1 to 5.0. The best ratio depends on the material to be bonded, the press time and press temperature, pH and buffer capacity as well as other unreacted resin components. The blended modified resin can be extended or filled and hardened by conventional techniques before or after additive is fully added.

The odor of formaldehyde in a hardened or cured resin is attributable, to a large extent although not exclusively, to the presence of free formaldehyde remaining therein, or to methylol and other compounds containing formaldehyde in loosely bonded form. Theoretically, in a urea-formaldehyde system, urea, which has four amine hydrogen atoms, is capable of reacting with formaldehyde in a 1:4 ratio in order to form a hardened resin. As a practical matter, however, resin formation is a complex multiple step process and a small portion of the formaldehyde is never incorporated into the polymeric resin structure, even when less than a theoretical excess of formaldehyde is employed in the original urea-formaldehyde reaction mixture. Furthermore, formaldehyde may be released from fully or from incompletely cured resin by hydrolysis, thermolysis or ageing. The mechanism of formaldehyde release from finished products has been and is being widely studied, but is not yet well understood. [R. Myers, U.S. Forest Products Laboratory, Madison, Wisc., Technical Reports, 1977-1979.] In the case of insulation foams or bonded wood products, especially in particle board in which wood has a large surface area, the release is influenced by secondary processes such as adsorption, absorp-tion desorption and vaporization.

Due to its complex origin, this uncombined, loosely bonded or excess or free formaldehyde in the hardened resin is not measurable precisely by present technology. Different analytical techniques yield different values, and current standard methods for the determination of formaldehyde release from finished products are not yet reliable. For example, the European perforator test, the Japanese desiccator test, and various tests currently used in the U.S. do not reliably correlate. One problem in measurement results from decomposition of the resin during the measuring process. However, according to best estimates, free formaldehyde, in well formulated and well cured resins amounts to approximately 0.1% or more of the original formaldehyde used.

The additive can be easily applied by addition to dry or aqueous resin before shipping, by addition during the final glue formulation at the plant, when filler and extenders are added, and water content is adjusted, and independent or jointly with the hardener if such is separately applied. If desired, a pH buffer may be added. The modified resin can be applied to wood or other practicles, chips, strands or fibers or similar particles made from different materials such as perlite, or the like, or any other material which can be bonded with the generic resin. The application of the modified resin and its curing can be achieved using the same conditions and equipment as normally used with the corresponding additive-free resin. This is a particularly important advantage of the present compositions, since their use does not require modifications of existing processes and equipment either in the resin factory or the application plant. Thus, their use can rely on all existing art and techniques.

The composition can be used in a variety of ways, for example, as components in cold cured insulating foam, hot-setting formulations for making wood particle board, the manufacture of plywood, the assembly of laminated boards, the impregnation of wood, paper and textiles, for surface coatings or as an adhesive layer connecting materials such as wood, rubber, metals, aminoplasts and phenoplasts. Furthermore, the present compositions are suitable for fillers for adhesive or molding products, as gap-filling cement, and in conjunction with all uses for which urea-formaldehyde, phenol-formaldehyde, melamine-formaldehyde and their blends and copolymers and their modified or extended or filled variations can be used.

While the composition of the invention may be prepared by adding one of the above mentioned materials in the exact molar ratio necessary to bind excess formaldehyde under individual application conditions determined by the nature of the bonded product, various modifications are also contemplated. For example, the desired sulfur content may be obtained by using a mixture of the sulfur compounds mentioned above, say dithionite, thiosulfate and polythionate of sodium, or sodium and ammonium salts of thiosulfates, etc, reagents which lead to mixtures, such as for example sulfur dioxide and hydrogen sulfide, as recovered from "After Claus" recovery plants, or from certain sulfur abatement processes used in connection with power plants. Such mixtures, including the so called Wackenroder liquid, may be applied as solutions, slurries, etc. Additionally, sulfur, or in situ sulfur may be incorporated during the last stage of resin preparation. In all cases care must be taken to balance pH and buffer capacity of resins. Thus, the ammonia content must be balanced with other ions. Furthermore, the influence of all chemicals, especially ammonia on wood must be considered, as well known to all those skilled in the art. In the case of sulfides, care must be taken due to their great reactivity, toxicity, and because molar excess if sulfides might lead to release of gases during pressing, a process which leads to the "blowing" of bonded products during thermosetting.

In order to achieve maximum effects, the additive should be finely ground, dissolved or suspended and thoroughly mixed with the resin. This can be achieved, for example, by blending and stirring the additive into the resin, just before spraying the resin as insulating foam, or as an adhesive onto the material to be bonded. The resulting liquid or liquid slurry can be used in a conventional way alone, or modified as indicated above for different applications, such as all or part of different layers of composites, multi-layers or laminated or so-called sandwich boards or products.

While not wishing to be limited to the reasons therefor, it appears that the success of the invention is due to the selective interaction between the above sulfur compounds and methylene glycol formed from formaldehyde in the presence of the semi-aqueous resin. In the case of thermosetting resins, success appears to be attributable to the temperature dependence of the interaction, while in the case of cold setting resins, the pH dependence of the interaction is apparently important.

The basic reactions of aqueous formaldehyde have been explored [J. R. Walker, "Formaldehyde", ACS Monograph Series, Rheinhold Publishers, 3rd edition, New York, 1965]. In such systems formaldehyde exists in the form of an equilibrium mixture containing methylene glycol and polyoxymethylene glycol. If methanol is present as a stabilizer, hemiacetals are also formed. Likewise, the sulfur compounds of this invention are well known [B. Meyer, Sulfur, Energy and Environment, Elseviev, Amsterdam, 1977], but the mechanism of their reactions is still poorly understood.

Thiosulfate reacts with formaldehyde at low pH forming unidentified products. [A. Kurtenacker, Z. Anorg. Anal. Chem. Volume 238, page 348, 1938]. In the resin system it is initiated by the action of the hardener or catalyst. At a very low pH, thiosulfate can also undergo auto redox reactions yielding sulfur compounds in their nascent state, containing labile intermediates.

Sulfites form adducts with formaldehyde which contain C-S bonds. These complexes are stronger than those of thiosulfate, and are used in analytical chemistry to mask sulfite so that thiosulfate can be titrated in mixture with sulfite [A. Kurtenacker, Z. Anal. Chem. volume 64, page 56, 1924]. In fact, the sulfite interaction is so strong that excess sulfite is capable of degrading and solubilizing cured formaldehyde resin [B. Meyer, "U-F Resins", Addision-Wesley, Waltham, Mass., 1979, in press].

Elemental sulfur and polythionates do not combine with formaldehyde under resin storage conditions. In contrast, all sulfides except insoluble sulfides react quite readily with formaldehyde and yield over a period of days or several hours various thiane products, the nature and yield of which depends on pH, concentration and many other conditions. Volatile sulfides are usually more reactive and must be treated with caution because of their toxicity.

Dithionite reacts in a complex manner yielding at least two types of products, one being $CH_2(OH)SO_3$, as in the case of sulfite, and a lens stable compound, probably $CH_2(OH)_{2-x}SO_x$, where x is 1 or 2. Hydroxymethane sulfinate is well known in the polymerforming industry [B. Meyer, "Sulfur, Energy and Environment," Elsevier, Amsterdam, 1977]. Furthermore, dithionite also has a tendency to decompose alone in aqueous solution yielding complex compounds [L. Peter, Ph.D. Thesis, Univ. of Washington, Seattle, 1979, "Raman Spectra of Oxyacids of Sulfur."].

The sulfur compounds of this invention are characterized by the fact that they react with free formaldehyde, especially during curing conditions under the influence of heat or acid but that they do not complete their reaction with the pre-cured resin materials under storage conditions. Thus, all additive compositions can be prepared, applied, sprayed according to practice currently in use for urea-formaldehyde or other formaldehyde resins, and such practice is well known by those skilled in the art.

The nature of the sulfur compounds in the products is not yet known. However, Raman spectra of cured foam surface samples and fracture surfaces of bonded wood products show vibrational bands at 777 $cm^{-1}$ which correspond to the C—S bond, and sometimes at 1020–1150 $cm^{-1}$ which corresponds to the symmetric stretch motion of S-O. From this it can be concluded that depending on pH, concentration and temperature, several types of $CH_2$—S bonds can be formed. Among them are $CH_2(OH)SO_3$ and compounds of the thiane and polythiane type. The thianes are known to be capable of copolymerization with formaldehyde [U.S. Pat. No. 3,300,445, H. Sidi. The active sulfur form depends on the reagent and reaction conditions. A desirable sulfur form for the purpose of our invention is sulfur in an oxidation state between $-2$ and $+5$, and native sulfur resulting from decomposition of the parent compound by ionic and radical degradation [B. Meyer, L. Peter and K. Spitzer, Inorg. Chem., Volume 16, page 27, 1977] or by autodissociation or redox reaction, which in the case of thiosulfate, for example, can lead to a mixture of either elemental sulfur ($S^0$) and sulfite ($S^{+4}$), or sulfide ($S^{-2}$), dithionate ($S^{+5}$) and sulfate ($S^{+6}$) [O. Schmidt, Chem. Ber. Volume 39, page 2413, 1906, and L. Vanino, Chem. Ber., Volume 47, page 2562, 1914].

Urea does not react with sulfur additives under storage conditions, nor does melamine or phenol in the presence of the precured resin mixture. However, it is known that several of the above sulfur compounds can be incorporated into the basic composition during preparation of urea-formaldehyde molding resins [I. Kreidl, U.S. Pat. No. 2,113,485; Pfenning-Schumacher, Brit. Patent No. 313,455, and ICI, Brit. Patent No. 463,433, etc.] and into phenol-formaldehyde resins [I. Kreidl, French Patent No. 806,286]. For this purpose, urea, formaldehyde and sulfur compounds are mixed in molar ratios of 4:8:0.4 and are reacted at high pH at 40° to 80° C. for several hours, yielding a moldable resin. Our invention differs in that our sulfur is not part of the original resin, and does not react to become part of the basic urea-formaldehyde or phenol-formaldehyde resin skeleton which makes the ready-to-use resin, but reacts essentially selectively with terminal and excess free formaldehyde during the curing of the already prepolymerized resin. As used herein, the term "prepolymerized resin" is intended to refer to synthetic resins composed of an aldehyde and at least one monomer polymerizable therewith which have been partially reacted to form said resin, but are not in the hardened or finally cured state. Such resins are also commonly referred to as "ready-to-use resins".

According to the present invention the sulfur additive reacts under storage conditions only in a preliminary way with formaldehyde, and achieves its formaldehyde-binding action partly or primarily during the curing of the resin. Thus, it binds both free formaldehyde present in the resin and formaldehyde released from the resin during the process of application or curing after the finished resin mixture is applied and spread onto the surface of the wood, perlite or other material to be bonded, and while the bonded material is being shaped and pressed or during the spraying and curing of the foam. Under acid or high temperature curing conditions all of the sulfur compounds of this invention are capable of reacting with formaldehyde forming a mixture of products such as hydroxysulfonates, thianes, polythianes and polymethylene polysulfides, the detailed composition of which depends on individual factors one of which is pH.

In the art of curing thermosetting formaldehyde resins, a variety of agents are employed to accelerate final curing of the resin. Most of these act .y lowering the pH of the resin mixtures. Cold setting resins are often cured by agents containing phosphoric acid. Among hardening agents for thermosetting compounds are compounds which upon heating release acid to lower the pH of the resin so that its polymerization is enhanced. A typical hardener is ammonium chloride which is believed to decompose under hot press conditions to ammonia and hydrogen-chloride of which the first reacts with formaldehyde or escapes or penetrates the wood, and the second dissolves in the resin, thereby affecting the pH. Sulfur dioxide has long been proposed [A. Curs & H. Wolf, I. G. Farbenindustrie, G.P. 636,658] as a hardening agent because of its acidic reaction in contact with aqueous media. Likewise, ammonium sulfite has been proposed as hardener [B. Meyer, U-F Resins.] Several of the sulfur compounds of this invention, especially the ammonia salts, intrinsically contain the same ability. Thus, ammonium disulfite or polythionate can readily release sulfur dioxide which not only reacts with formaldehyde, but also acts as a biprotic acid with $pK_1=1.92$ and $pK_2=7.2$. Thus, hardening action of the sulfur compounds can be used to substitute or complement traditional hardeners which are normally added at the time of resin application or are built into the resin formulation.

The mechanical and chemical properties of the products prepared with resins of this invention are essentially the same as those of the unmodified resin. However, in some instances, minor changes are observed which do not detrimentally affect these properties. Raman spectra indicate the presence of supplemental $CH_2-S$ bonds [B. Meyer, U. F. Resins, "Reactions of Formaldehyde"]; and, sometimes, of excess sulfur which, if present, acts as indicated in a previous U.S. application Ser. No. 749,381 of Dec. 10, 1976.

In many cases, the sulfur-formaldehyde products constitute a viable polymer product component and contribute significantly to the product strength. Thus, in order to achieve various enhanced structural properties, it is desirable to reinforce the original resin with formaldehyde before sulfur compounds are added, to add sulfur compounds partly complexed with formaldehyde or to employ a resin especially rich in formaldehyde. The trend of properties of such bonded products is demonstrated for illustrative purposes by the following test results obtained on three different types of boards. One board was made from Douglas fir chips coated with 6% weight, based on solid content, of a urea-formaldehyde resin containing a 0.3 M excess of formaldehyde; a second board was made exactly in the same manner, using the same ingredients, except that 0.6% weight, based on solid content, of formaldehyde was added to the resin before application; and a third board was made exactly as the second, except that 0.6% weight of thiosulfate was added to the resin before application. The internal bond strength of the three boards was 140, 140 and 170 psi, respectively, and their modulus of rupture was 3940, 4300 and 5700 psi, respectively. Furthermore, reinforced resins have the potential of being made better weather resistant.

The compositions of this invention are generally prepared in an aqueous medium, or in a slurry, using an aqueous medium, alcoholic medium or a portion of the resin as a carrier. If dry resins are used, the additive may be added in dry form and premixed or shipped as part of the precursor of the ready-to-use resin.

Total sulfur content of the present invention varies between 0.3 to 30% on the basis of resin solids. When urea-formaldehyde resins are used, the formaldehyde to urea molar ratio, as originally prepared or as fortified with additional formaldehyde, may be between 1.3 and 5, i.e., it may exceed the presently acceptable formaldehyde content substantially, without loss of effectiveness as deodorant. For example, the formaldehyde content may be as high or even higher than commonly used during the period of 1920–1940 when the art of formulating urea-formaldehyde resins are optimized for mechanical criteria rather than the modern environmental criteria. This is a specific advantage, because high formaldehyde resins constitute the basis for many materials which have fire resistant properties, superior to modern and more expensive substitutes, and are based on a sophisticated art which is in progress of being abandoned primarily because of environmental odor concerns which the results of our invention nullify. Furthermore, urea-formaldehyde resins can be easily disposed of after use as they constitute a nitrogen-rich fertilizer. The sulfur compounds employed according to the present invention all can degrade to nontoxic products which significantly contribute to the plant nutrient value.

In terms of excess formaldehyde in a hardened resin, the formaldehyde to sulfur molar ratio may be between 1 to 10 and 10 to 1, but it is best kept in a range yielding molar matching of reagents. However, the molar ratio necessary for matching depends on several factors, some of which depend on the resin, some on the manufacturing conditions and some on the products to be treated. They have to be established in each case by careful consideration. For example, in some cases one sulfur will be able to bind two formaldehyde molecules, while under other conditions, only one formaldehyde entity might be bound. Likewise, some sulfur-sulfur bonded compounds, such as dithionate, dithionite, thiosulfate or polythionate might yield one reactive sulfur for each reagent molecule, and some two, depending on pH and redox-conditions, which can cause disproportionation into sulfide and sulfate, of which the latter is ineffective. Finally, some sulfur might form disulfide or polysulfide bridges which, depending on purpose of the composition can be a distinct advantage, as it usually imparts flexibility to the product. It is furthermore possible to add excess elemental sulfur, as such or in nascent form to the formulation, as indicated in U.S. application Ser. No. 749,381 of Dec. 10, 1976.

The role of the various ingredients is not in all compositions the same, and furthermore different intermediates may engage in different synergistic interactions.

The invention is illustrated, but not limited by the following examples. As used herein, all percentages and ratios are by weight and are based on dry weights unless otherwise noted.

EXAMPLE 1

48 g of a commercial urea-formaldehyde particleboard resin containing 64% resin solid and a urea-formaldehyde ratio of 1:1.3 was mixed with 1.5 g sodium thiosulfate dissolved in 4 ml of a 2 M ammoniumchloride solution. The resulting adhesive was sprayed onto 500 g of Douglas fir chips containing 6% moisture, and the resulting mixture was pressed into a board with the dimensions $5/16 \times 12 \times 12$ inches. A press temperature of 310° F. was used, and the press time was 4 minutes including $2 \times 20$ seconds for press closure and release, respectively. Comparison with a control board made from the same materials by the same method, except that sodium thiosulfate was omitted, showed that all properties were undistinguishable, except that the board prepared according to the present invention exuded no formaldehyde odor, while the control board released substantial amounts of formaldehyde during press operation, and distinctly smelled from formaldehyde after cooling to room temperature.

EXAMPLE 2

45 g of a commercial urea-formaldehyde particleboard resin containing 62% resin solids and formaldehyde excess of 0.3 was mixed with an additive solution prepared by combining 15 ml of 38% formaldehyde solution with 5 g ammonium thiosulfate. The resulting resin was applied to 700 g Douglas fir chips, as described in Example 1 and 550 g were used to prepare a board. A comparison of the properties of this board with a control board containing only commercial resin and 4 ml hardener, and a second board containing only resin, hardener and 15 ml of a 38.5% formaldehyde solution showed that all properties of all three boards are within experimental limits the same, except that the board containing thiosulfate additive had an internal bond strength of 170 psi, as compared to a value of 140 for the others, and a module of elasticity of 5700 psi as compared to a value of 4200 psi for the others, all other conditions being the same.

EXAMPLE 3

48 g of a commercial urea-formaldehyde particleboard resin containing 64% resin solid and a urea-formaldehyde ratio of 1:1.3 was mixed with 3 g sodium dithionite dissolved in 4 ml of a 2 M ammoniumchloride solution. The resulting adhesive was sprayed onto 500 g of Douglas fir chips containing 6% moisture, and the resulting mixture was pressed into a board with the dimensions $5/16 \times 12 \times 12$ inches. A press temperature of 310° F. was used, and the press time was 4 minutes including $2 \times 20$ second for press closure and release respectively. Comparison with a control board made from the same material by the same method, except that sodium dithionite was omitted, showed that all properties were undistinguishable, except that the board prepared according to our invention exuded the odor characteristic for wood, while the control board released substantial amounts of formaldehyde during press operation, and distinctly smelled from formaldehyde after cooling to room temperature.

Comparison of formaldehyde release using the test of Mohl [see, H. R. Mohl, Holz als Roh- und Werkstoff 36, 69 (1978), "Saug- und Spaltmethode zur Bestimmung der Formaldehydabgabe von Hozwerkstoffen und Leimen sowie zur allgemeinen Luftanalyse, 1. Mitteilung: Methodenbeschreibung."] showed reduction by 48% after 24 hours in the sulfur modified board.

EXAMPLE 4

45 g of a commercial urea-formaldehyde particleboard resin containing 62% resin solids and a formaldehyde excess of 0.3 was mixed with an additive solution prepared by combining 15 ml of a 38% formaldehyde solution with 1.2 g ammonium dithionite. The resulting resin was applied to 700 g Douglas fir chips, as described in Example 1 and 550 g were used to prepare a board. A comparison of the properties of this board with a control board containing only commercial resin and 4 ml hardener, and a second board containing only resin, hardener and 15 ml of a 38.5% formaldehyde solution showed that all properties of all three boards were within experimental limits the same, except that the board containing dithionite additive had an internal bond strength of 170 psi, as compared to a value of 140 for the others, and a module of elasticity of 5700 psi as compared to a value of 4200 psi for the others, all other conditions being the same. After 24 hours the formaldehyde release was measured in the board containing the dithionite additive and found to be 40% lower than in a similar board not containing the additive.

EXAMPLE 5

15 g of a commercial melamine-urea-formaldehyde resin containing 47% resin solids and 0.2 excess of formaldehyde was blended with 0.5 ml of 2 M ammonium-chloride in which 1.3 g potassium pentathionate were dissolved. The resin was applied to 1500 g Sugar Pine chips containing 5% moisture, and the mixture was pressed into a 0.8×15×15 cm board of 0.7 density of pressing the material for 6 minutes at 330° F. After 24 hours the formaldehyde release was measured and found to be 33% lower than in the reference board.

EXAMPLE 6

50 g of a urea-plywood resin containing 55% resin solids and a 1 M excess of formaldehyde was mixed with 1 g ammonium polysulfide (of an average sulfur content of 4.5 S per molecule, as determined by NMR) dissolved in 5 ml of a 2 M solution of ammonium chloride, and the resulting resin was sprayed on 1 kg expanded perlite and pressed into a ½ inch thick board by heating the mixture to 330° F. for 5 minutes and maintaining a pressure of 1500 psi. The resulting board exuded no formaldehyde odor whatsoever, but otherwise resembled in every respect a similar board made from the same ingredients by the same method. After 24 hours the formaldehyde release was measured and found to be 19% lower than in the reference board.

EXAMPLE 7

45 g of a urea-melamine particle board resin containing 60% resin solids and 0.3 M formaldehyde was mixed with 2 ml of a saturated ammonium sulfide solution and subsequently with 2 ml water in which 1 g ammonium-pyrosulfate was suspended. The resulting resin was applied to 700 g sugar pine chips and tested as in the preceding samples, and no formaldehyde odor was noted, while a control board released the distinct formaldehyde odor. After 24 hours the formaldehyde release was measured and found to be 20% lower than in the reference board.

EXAMPLE 8

3 g potassium disulfite (pyrosulfite) and 3 g borax were stirred with 5 ml water, and the slurry was blended in a medium speed blender with 50 g of a 60% solid content urea-formaldehyde resin, and the resin was used to make sugar pine board as above. The product did not smell from formaldehyde, while a control board strongly smelled from formaldehyde. After 24 hours the formaldehyde release was measured and found to be 30% lower than in the reference board.

EXAMPLE 9

5 g sodium thiosulfate and 5 g urea-formaldehyde resin were blended and added to 40 g resin prepared by condensing urea, melamine and phenol in the ratio of 4:4:1 with 10 molar parts of formaldehyde was mixed with 1 kg sawdust and the mixture pressed into a 5/8 thick board. The resulting product, pressed 5 minutes at 350° F. did not exude any formaldehyde odor and swelled only a fraction of that observed for commercial resin. After 24 hours the formaldehyde release was measured and found to be 15% lower than in the reference board.

EXAMPLE 10

2 g ground commercial grade sulfur and 2 g ammonium polysulfide solution and 2 g sodium tetrathionate were mixed with 45 g resin as in Example 2 and tested as in Example 2. The board did not exude any formaldehyde odor whatsoever.

EXAMPLE 11

45 g phenol-formaldehyde resin containing 60% resin solids and a molar excess of 0.3 of formaldehyde was mixed with 5 ml of a slurry containing 4 g of a mixture of iron, calcium and magnesium oxide which had been used to wash the sulfur oxyacids from an aqueous air pollution abatement pilot reactor in which coal combustion fumes containing 1% sulfur dioxide had been treated. The blended mixture was used as a resin to make a 3-layer plywood sheet.

EXAMPLE 12

UF-insulation foam was produced from commercial UF-dry resin, conditioner and hardener according to practice known to those familiar with the trade, using two solutions, (a) a dilute resin solution containing 33% resin solid and the commercial conditioner, and (b) a resin hardener solution matched to water hardener. Five gallons of each solution were prepared and foam was sprayed by pumping the two solutions in a ratio of 1:1 into a commercial foam gun. After 2 gal of each liquid were converted to foam and cast into 4 in.×1 yd.×1 yd. slabs of foam, commercial wettable grade elemental sulfur was stirred into the residual 3 gal resin in the ratio indicated in Table I, and foam was produced without any modification of procedure or equipment. The resulting foams were indistinguishable in every respect, except for a faint, yellowish tint in the case of the highest sulfur concentration. The gel time was identical, and the foam was homogenous and could be sliced normally after one minute. Foam densities were 55-60 g/liter of wet foam, and 12-14 g/l of foam air dried for 3 weeks. The relative rate of formaldehyde release after 3 weeks is summarized in Table I. Formaldehyde release from ground foam gave similar results.

TABLE I
RELATIVE FORMALDEHYDE RELEASE FROM UF-FOAM WITH AND WITHOUT 3 SULFUR CONTAINING ADDITIVES**

| Additive | 0 | (wt %)* 2 | 4 |
|---|---|---|---|
| Elemental sulfur | 100 | 48 | 30 |
| Sodium dithionite | 100 | 36 | 18 |
| Sodium sulfite + sodium bisulfite (1:1) | 100 | 69 | 73 |

*On basis of resin solid content
**Air dried three week old sample

EXAMPLE 13

Foam was prepared as in Example 12, except that sodium dithionite was substituted for elemental sulfur. The results are shown in Table I. All samples were white and undistinguishable.

EXAMPLE 14

Foam was prepared as in Example 12, except that a 1:1 (molar basis) of sodium sulfite and sodium bisulfite was used. The results are shown in Table I. Samples were white and not distinguishable.

The present invention describes simple additives containing sulfur in an oxidation state other than +6 which can be blended as a liquid, a solution or a slurry or a solid into conventional urea-formaldehyde, melamine formaldehyde, or phenol-formaldehyde resins, yielding conventional products, except for greatly reduced or fully suppressed formaldehyde odor. The sulfur to formaldehyde ratio depends on excess formaldehyde, which would not be expected to be incorporated into the resin structure upon curing, present in ready-to-use resin, but advantageously is in the range of 10:1 to 1:10.

The term "ready-to-use resin", as used herein and the claims which follow, is intended to connote the various resins which are prepolymerized to a resinous state but which are capable of being hardened or cured upon further treatment.

The average valence states of illustrative effective oxysulfur compounds useful according to the invention are as follows:

| Valence | Formula | Name |
|---|---|---|
| +5 | $S_2O_6^{-2}$ | Dithionate |
| +4 | $SO_3^{-2}$, $S_2O_5^{-2}$ | Sulfite, Pyrosulfate (=Disulfite) |
| +3.3 | $S_3O_6^{-2}$ | Trithionate |
| +2.5 | $S_4O_6^{-2}$ | Tetrathionate |
| +2 | $S_2O_3^{-2}$ | Thiosulfate |
| +2 | $S_2O_4^{-2}$ | Dithionite (=Hydrosulfite) |
| +10/x | $S_xO_6^{-2}$ | Polythionate |
| +0 | $S_8$ | Elemental Sulfur |
| −1 | $S_2^{-2}$ | Disulfide |
| −2/x | $S_x^{-2}$ | Polysulfide |
| −2 | $HS^-$, $S^{-2}$, RSH | Sulfide, (organic: mercaptans) |

For references giving the structures and reactions of these compounds, see: B. Meyer, "Elemental Sulfur", Chemical Reviews, Volume 76, page 367, 1967, and B. Meyer, "Sulfur, Energy & Environment", Elsevier, Amsterdam, 1977, and B. Meyer, "U-F Resins", Addison-Wesley, Waltham, Mass., 1979, in press.

The present invention may comprise, consist of, or consist essentially of the hereinabove recited constituents and steps.

It will also be appreciated that various modifications may be made in the invention as described above. Thus, while the invention has been described with particular reference to three types of formaldehyde resins, other aldehyde resins based on, say resorcinol, acetaldehyde, or furfural, etc., may be usually employed. Hence, the scope of the invention is set forth in the following claims wherein:

What is claimed is:

1. A method for reducing the aldehyde odor of a synthetic resin, said synthetic resin being produced by the polymerization of an aldehyde and at least one monomer polymerizable therewith, which comprises adding to said resin in a polymerized state a sulfur compound wherein the sulfur is in a valence state other than +6, said sulfur compound being added in an amount sufficient to reduce the odor of said aldehyde upon final curing of said resin, the sulfur compound being added to said resin subsequent to prepolymerization but prior to the final curing thereof.

2. A method according to claim 1, wherein the sulfur in said sulfur compound is in the valence state ranging from +5 to −2 inclusive.

3. A method according to claim 1, wherein said sulfur compound is selected from the group consisting of thiosulfates, polythionates, sulfites, pyrosulfites, dithionates, dithionites, elemental sulfur, sulfides, pentathionates, mercaptans and metastable disulfides.

4. A method according to claim 1, wherein said sulfur compound is selected from the group consisting of dithionites, elemental sulfur and mixtures thereof.

5. A method according to claim 1, wherein said sulfur compound comprises a mixture of a sulfur compound as recited in claim 4 with a different sulfur compound as recited in claim 1.

6. A method according to claim 1, wherein said odoriferous aldehyde is formaldehyde.

7. A method according to claim 6, wherein said monomer is selected from the group consisting of urea, phenol, melamine or mixtures thereof.

8. A method according to claim 1, wherein said curing involves the heating of said prepolymerized resin.

9. A method according to claim 6, wherein said monomer is urea.

10. A method according to claim 1, wherein said sulfur compound is added in an amount of about 0.3 to 30% by weight of sulfur value based on the weight of the total resin solids.

11. A method according to claim 1, wherein said sulfur compound is added in an amount of about 2–10% by weight of sulfur value based on the weight of the total resin solids.

12. A method according to claim 6, which comprises the additional step of adding additional formaldehyde to said prepolymerized resin before the curing thereof.

13. A method according to claim 9, wherein the molar ratio of formaldehyde to urea monomers is between 1.3 and 5.

14. A method according to claim 9, wherein the molar ratio of formaldehyde to urea is adjusted to between 1.3 and 5 by adding additional formaldehyde to said prepolymerized resin before the curing thereof.

15. A method according to claim 1, wherein said prepolymerized resin containing said sulfur compound is applied as an adhesive before it is cured.

16. A method according to claim 1, wherein said cured resin is in the form of an insulating foam.

17. A method according to claim 1, wherein said resin is selected from the group consisting of urea-formaldehyde, phenol-formaldehyde, melamine formaldehyde, melamine-urea-formaldehyde, and melamine-urea-phenol-formaldehyde.

18. A method according to claim 1, wherein said resin is thermosetting.

19. A method according to claim 1, wherein said resin is urea-formaldehyde.

20. A method of reducing the aldehyde odor from a bonded wood product which is bonded with a synthetic resin which is produced by the polymerization of an aldehyde and at least one monomer polymerizable therewith, which comprises bonding said wood product with a synthetic resin produced according to the method of claim 1.

21. A method according to claim 20 wherein said bonded wood product is particle board.

22. A method according to claim 20 wherein said bonded wood product is plywood.

* * * * *